(12) United States Patent
Wensbo Posaric

(10) Patent No.: US 12,065,352 B1
(45) Date of Patent: Aug. 20, 2024

(54) AUTOMATIC LIQUID DISPENSER

(71) Applicant: Ockham Technologies AB, Lund (SE)

(72) Inventor: David Wensbo Posaric, Lund (SE)

(73) Assignee: Ockham Technologies AB, Lund (SE)

( * ) Notice: Subject to any disclaimer, the term of this patent is extended or adjusted under 35 U.S.C. 154(b) by 0 days.

(21) Appl. No.: 18/564,668

(22) PCT Filed: May 28, 2022

(86) PCT No.: PCT/SE2022/050518
§ 371 (c)(1),
(2) Date: Nov. 28, 2023

(87) PCT Pub. No.: WO2022/255922
PCT Pub. Date: Dec. 8, 2022

(30) Foreign Application Priority Data

Jun. 4, 2021 (SE) .................................. 2130155-1

(51) Int. Cl.
*B67D 1/12* (2006.01)
*B67D 1/08* (2006.01)

(52) U.S. Cl.
CPC .......... *B67D 1/124* (2013.01); *B67D 1/0888* (2013.01); *B67D 1/1227* (2013.01); *B67D 1/1238* (2013.01)

(58) Field of Classification Search
CPC . A47J 31/4482; B67D 1/1236; B67D 1/1227; B67D 1/124

USPC .................................................. 141/83, 352
See application file for complete search history.

(56) References Cited

U.S. PATENT DOCUMENTS

| | | | |
|---|---|---|---|
| 4,236,553 A | 12/1980 | Reichenberger | |
| 6,082,246 A * | 7/2000 | Thorn ................. | A47J 31/4482 99/279 |
| 11,518,666 B2 * | 12/2022 | Park ..................... | B67D 1/0888 |
| 2006/0108023 A1 | 5/2006 | Greiwe et al. | |
| 2017/0231431 A1 * | 8/2017 | Maeng ................ | A47J 43/0716 99/485 |

FOREIGN PATENT DOCUMENTS

| | | |
|---|---|---|
| DE | 102019115337 A1 | 12/2020 |
| EP | 1647951 A1 | 4/2006 |
| EP | 2454975 A1 | 5/2012 |
| EP | 3586695 A1 | 1/2020 |
| JP | 2020177405 A | 10/2020 |
| WO | 2016177416 A1 | 11/2016 |

* cited by examiner

*Primary Examiner* — Timothy P. Kelly
(74) *Attorney, Agent, or Firm* — Patent Grove AB; Tomas Friend

(57) ABSTRACT

The present invention discloses a liquid dispenser (1000), for transfer of liquid (220) from a storage container (800) to a receiving container (700) having a receiving aperture (710) facing upwards. The liquid dispenser (1000) comprises a flow controller (400), a liquid conductor (210), a liquid outlet element (200), a vertical actuator (100), a spatiality sensor (300) and a control unit (600). A method for production of a receiving container (700), having liquid (220) in its internal volume, is also disclosed.

9 Claims, 4 Drawing Sheets

AUTOMATIC LIQUID DISPENSER

TECHNICAL FIELD

The present invention generally relates to dispensing devices that transfer various liquids to various containers, particularly in an automatic fashion.

BACKGROUND

A liquid, intended for use in which the user is directly exposed to the same or in which the user must handle it under close proximity, is most often temporarily comprised within a container for temporal storage, i.e. a service-container. Examples of such service-containers include coffee cups, drinking glasses, mugs, buckets, bottles, cans and jars, such as e.g. plastic jars with cylindrically shaped upper openings. The bulk of such a liquid is typically stored in a bulk-container, alternatively prepared on-demand by a separate device, such as e.g. a coffee brewer. The transfer of the liquid from such a bulk-container, or from such a separate device, is typically conducted by the employment of a liquid dispenser. Liquid dispensers of the prior-art include manual dispensers, which require user control in the form of on/off-input for provision of a desired volume of the liquid, and programmable or pre-settable dispensers, which typically outputs a pre-determined volume of the liquid upon user input. Examples of the former include the classical domestic water tap, the push-triggered milk dispenser commonly encountered at school canteens and the pull-triggered beer dispenser frequent at pubs. Examples of the latter include mechanic ketchup dispensers, often employed at hamburger restaurants, fixed-volume bottle-top dispensers, commonly used in a laboratory setting, and touch-screen-controlled coffee machines, a recent near standard in the office environment.

Disadvantages of manual and programmable dispensers of the prior-art include the high risk of overfilling of the service-container, whereby the adjacent environment is contaminated with the liquid. For example, a user filling up a glass from a manual dispenser may be distracted during the filling, whereby the maximum point in time for an off-operation may not be observed. In another example, the user of a programmable dispenser may erroneously have arranged a too small service-container for filling, e.g. an espresso cup having a relatively small internal volume, after having programmed the dispenser to provide a regular cappuccino with a total volume greatly exceeding that of the espresso cup.

Improved dispensers have been developed, whereby some remedy has been provided regarding above mentioned disadvantages.

U.S. Pat. No. 4,712,591 discloses a drink dispenser comprising an arm operative to sense the filled condition of a receptacle placed to receive liquid. A receptor is attached to the arm and located such that any liquid or foam falling upon the same from the receptacle is detected. The filling detection principle is thus based on the escape of liquid or foam, even if in relatively small amounts, from the receptacle. Hence, disadvantages of the dispenser according to U.S. Pat. No. 4,712,591 include, at least, contamination of the environment outside the inner surface of the receptacle.

U.S. Pat. No. 4,974,643 discloses a beverage dispenser comprising a dispenser head and a dispensed beverage level probe, onto which the upper edge of a receiving receptacle is tilted. Upon complete filling of the receptacle, an electric current between the dispenser head, via the beverage, and the dispensed beverage level probe, may be detected to trigger an off-state. The filling detection principle of the dispenser according to U.S. Pat. No. 4,974,643, and the thereto related disadvantages, are equivalent to the corresponding of the dispenser according to U.S. Pat. No. 4,712,591.

US 2010/0147417 A1 discloses a beverage dispenser comprising a plurality of dispensing valves associated with a plurality of different beverages. An electronic system is operatively coupled to a reader and a radio frequency tag on a container. The type of dispensed beverage is dependent on the signal transmitted from the radio frequency tag. Disadvantages of the dispenser according to US 2010/0147417 A1 include, at least, a risk of overfilling the container, e.g. in the case such container is partly pre-filled with any liquid prior to filling employing the beverage dispenser.

It would be advantageous with a liquid dispenser for simple and safe filling of a service-container, i.e. receptacle or receiving container, with one or several different liquids that allows for avoiding at least some of the above mentioned disadvantages and associated problems.

SUMMARY

It is an object of the invention, considering the disadvantages mentioned above, to provide a liquid dispenser which allows for facile filling of a service-container with a minimized risk of overfill.

It is another object of the invention, considering the disadvantages mentioned above, to provide a liquid dispenser which allows for automatic selection of type of liquid to dispense, as dependent on the geometry and/or size of the service-container.

It is yet another object of the invention, considering the disadvantages mentioned above, to provide a liquid dispenser which allows for automatic selection of volume of liquid to dispense, as dependent on the degree of liquid pre-filling of the service-container.

It is yet another object of the invention, considering the disadvantages mentioned above, to provide a liquid dispenser which allows for automatic selection of type of liquid and volume of liquid to dispense, as dependent on the geometry and/or size and the degree of liquid pre-filling of the service-container.

It is yet another object of the invention, considering the disadvantages mentioned above, to provide a liquid dispenser which prevents the user from removing the service-container during filling.

Accordingly, examples of the present invention preferably seek to mitigate, alleviate or eliminate one or more deficiencies, disadvantages or issues in the art, such as the above-identified, singly or in any combination by providing a liquid dispenser according to the appended patent claims.

According to a first aspect, there is provided liquid dispenser, for transfer of liquid from a storage container to a receiving container having a receiving aperture facing upwards, comprising a flow controller, a liquid conductor, a liquid outlet element, a vertical actuator, a spatiality sensor, a substantially horizontally arranged sheet shaped horizontal support and a control unit, wherein the flow controller is selected from the group of flow controllers consisting of valves and pumps and adapted to be in either an on-state, in which the liquid is transferred from the storage container via the liquid conductor and the liquid outlet element and the receiving aperture to the receiving container, or an off-state, in which the liquid is prevented from being transferred from the storage container to the receiving container, as dependent on electrical input from the control unit; the vertical actuator is in mechanical communication with the liquid outlet element and adapted to set the liquid outlet element in a maximum spatial state, in which the liquid outlet element is arranged at a maximum distance from the receiving container without contacting the same, or in a minimum spatial state, in which the liquid outlet element is arranged at a minimum distance above the receiving container without contacting the same and simultaneously arranged with its liquid exit hole in the vertical projection of the receiving aperture, as dependent on electrical input from the control unit; the spatiality sensor is adapted to detect a force change being due to the transition between a non-contacting state, in which the liquid outlet element is not contacting the receiving container, and a contacting state, in which the liquid outlet element is contacting the receiving container, and to provide information on such detection of force change in the form of electrical output to the control unit; the horizontal support having the spatiality sensor arranged at its upper or lower side and being adapted to allow placement of the receiving container on its upper side; and the control unit is adapted to give electrical output to the vertical actuator and to the flow controller, as dependent on the processing of electrical input from the spatiality sensor.

According to a second aspect, the liquid dispenser of the first aspect may be provided with a vertical actuator adapted to be able to set the liquid outlet element in the contacting state, and the spatiality sensor and the control unit may be adapted to together detect the transition from the non-contacting state to the contacting state. Advantages of a liquid dispenser according to this second aspect include, for example, the potential employment of a pressure-, a force- or a weight sensor as the spatiality sensor, whereby the scope of potential design and functionality of the liquid dispenser of the invention is greatly enhanced.

According to a third aspect, a method for production of a receiving container having liquid in its internal volume is provided. The method comprises the steps (i) to (iv), wherein steps (i) and (ii) may be carried out in any order: (i) providing a liquid dispenser of the first or the second aspect enabled to provide the liquid; (ii) providing the receiving container having a receiving aperture; (iii) placing the receiving container with the receiving aperture facing upwards at the operative location of the liquid dispenser; and (iv) removing the receiving container having liquid in its internal volume from the operative location of said liquid dispenser.

Further examples of the invention are defined in the dependent claims, wherein features for the second and third aspect of the disclosure are as for the first aspect mutatis mutandis.

Some examples of the disclosure provide for the filling of liquid to a receiving container with a minimized risk of overfilling the same.

Some examples of the disclosure provide for the filling of liquid to a receiving container that is already partly filled with liquid, with a minimized risk of overfilling the same.

Some examples of the disclosure provide for the filling of liquid to a receiving container with a minimized risk of cross contamination from a previous filling container.

Some examples of the disclosure provide for the filling of a particular type of liquid to a receiving container, as dependent on the spatial nature of the receiving container.

Some examples of the disclosure provide for the filling of liquid to a receiving container, without the user having to touch anything else but the receiving container.

Some examples of the disclosure provide for the filling of liquid to a receiving container while preventing the user to remove the receiving container during the filling.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
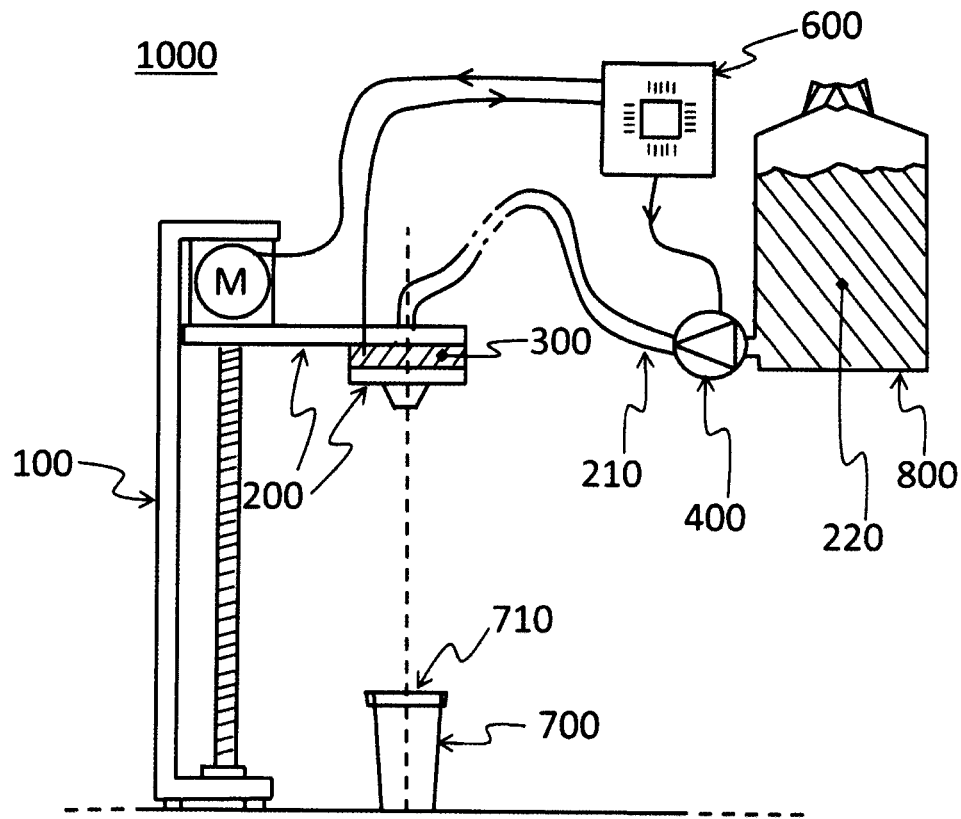
FIG. 1 is a view from the side of a liquid dispenser 1000 of the invention, showing a vertical actuator 100 having positioned a liquid outlet element 200 in a maximum spatial state, i.e. at a maximum distance from a receiving container 700 having a receiving aperture 710 facing upwards, also showing a spatiality sensor 300 integrated within the liquid outlet element 200 above a substantially flat lower side thereof facing downwards vertically above the receiving aperture 710, also showing a storage container 800 comprising liquid 220 enabled to be transferred employing a flow controller 400 being a pump via the liquid conductor 210 being elastic tubing through the liquid outlet element 200 and the spatiality sensor 300 via an outlet protruding from the lower side of the liquid outlet element 200 towards the receiving aperture 710, also showing a control unit 600 electrically connected to the flow controller 400, for output thereto, a motor of the vertical actuator 100, for output thereto, and the spatiality sensor 300, for input therefrom, according to examples of the disclosure.

Specific examples of the invention will now be described with reference to the accompanying drawings. This invention may, however, be embodied in many different forms and should not be construed as limited to the examples set forth herein, rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

The liquid dispenser 1000 of the invention essentially comprise a vertical actuator 100, a liquid outlet element 200, a liquid conductor 210, a spatiality sensor 300, a flow controller 400, a control unit 600 and a storage container 800.

Figure 3:
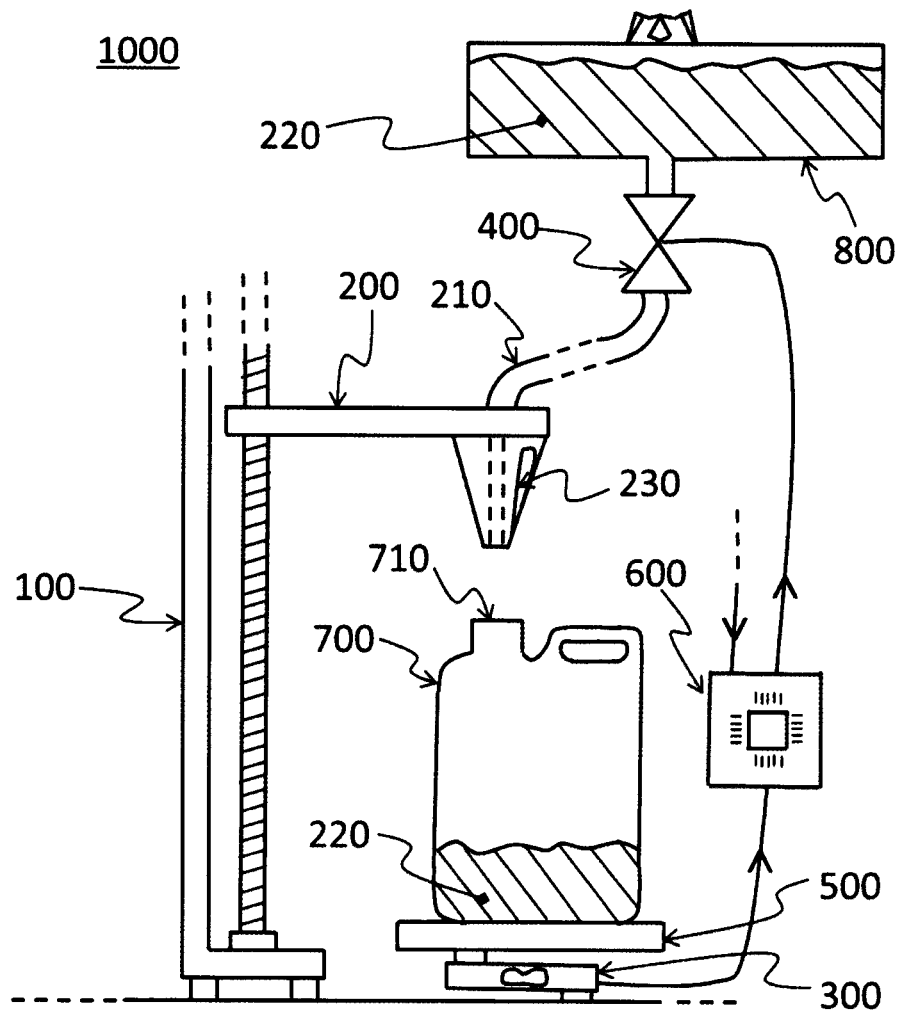
FIG. 3 is a partial view from the side of a liquid dispenser 1000 according to the invention, comprising an optionally elevated storage container 800 with liquid 220 connected to the liquid outlet element 200 via a flow controller 400 in the form of an on/off-valve, and via the liquid conductor 210 that continues within and exits from the inner volume of a cone shaped lower end of the liquid outlet element 200, an incision 230 along the vertical extension of the cone shaped lower end of the liquid outlet element 200, a horizontal support 500 connected at its lower side to the upper side of a spatiality sensor 300 in the form of a load cell, in turn connected at its lower side to an extension, in form of a common frame, of the vertical actuator 100 so that the load cell is in a spatial constant relationship with the vertical actuator 100, a receiving container 710 in the form of a plastic jar with a cylindrically shaped upper receiving aperture 710 of which vertical projection encompasses a liquid outlet opening for liquid 220 at the central lower point of the cone shaped part of the liquid outlet element 200, and a control unit 600 connected to the spatiality sensor 300 to receive electrical input therefrom for the determination of the weight applied onto the horizontal support 500, according to examples of the invention.
Figure 4:
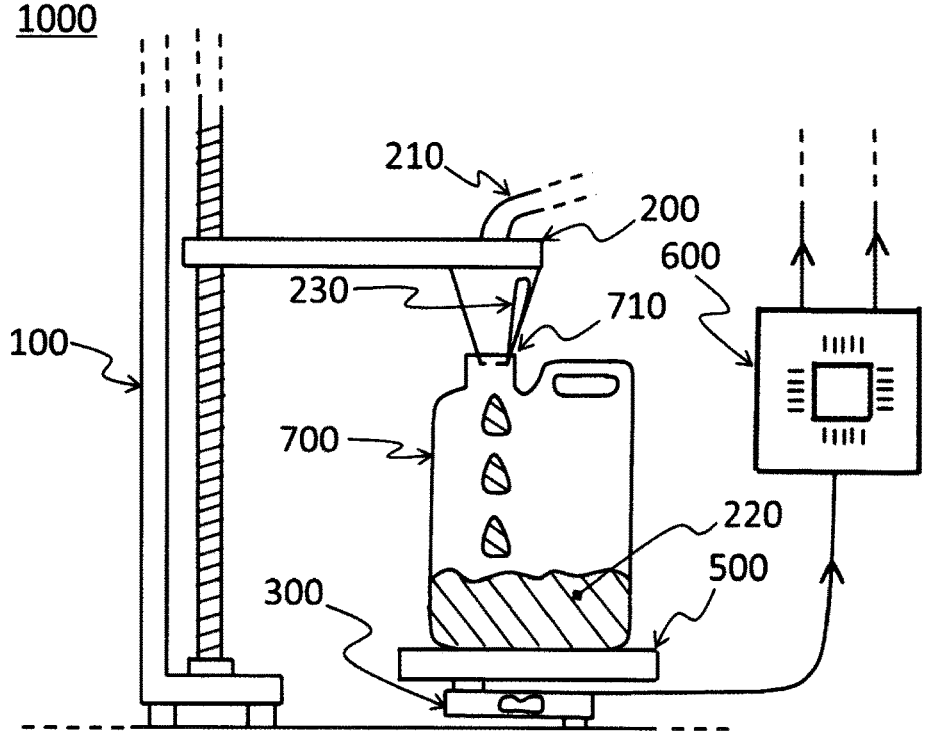
FIG. 4 is a partial view from the side of the liquid dispenser 1000 of FIG. 3, showing the liquid outlet element 200 in a minimum spatial state, in which minimum spatial state it is arranged with its liquid exit hole in the vertical projection of the receiving aperture 710 and not contacting the receiving container 700, yet so close thereto or within the same that liquid 220 may be transferred therethrough and through the receiving aperture 710 with a minimal risk of such liquid 220 being spilled outside the receiving container 700, according to examples of the invention.
Figure 5:
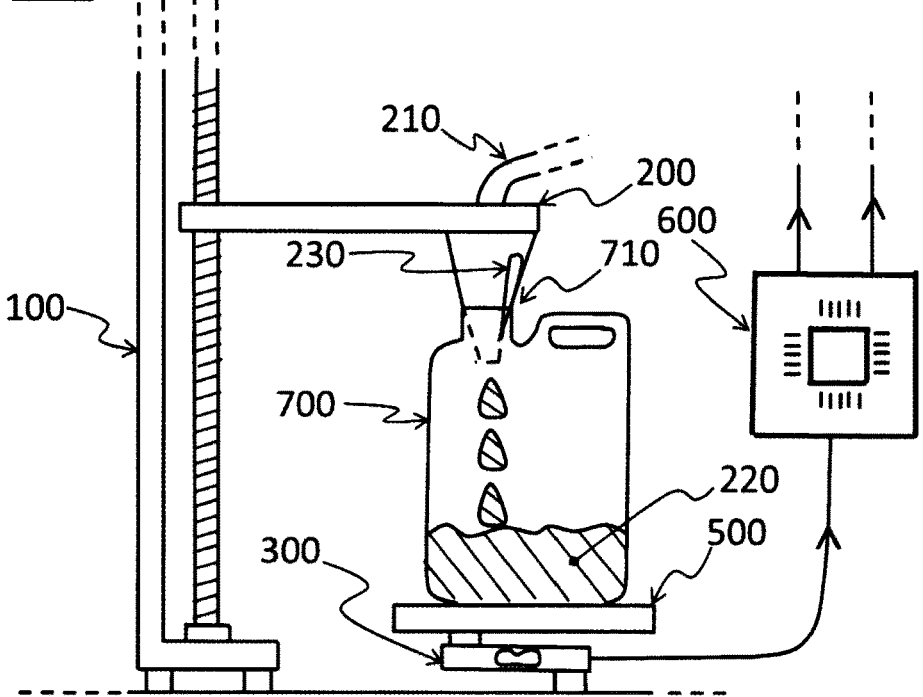
FIG. 5 is a partial view from the side of the liquid dispenser 1000 of FIG. 3, showing the liquid outlet element 200 in a contacting state, in which contacting state it is arranged with its liquid exit hole in the vertical projection of the receiving aperture 710 and contacting the receiving container 700, and also showing transfer of liquid 220 through the receiving aperture 710 while thereby displaced air may escape through the incision 230 to prevent the build-up of an overpressure in the receiving container 700, according to examples of the invention.
Figure 6:
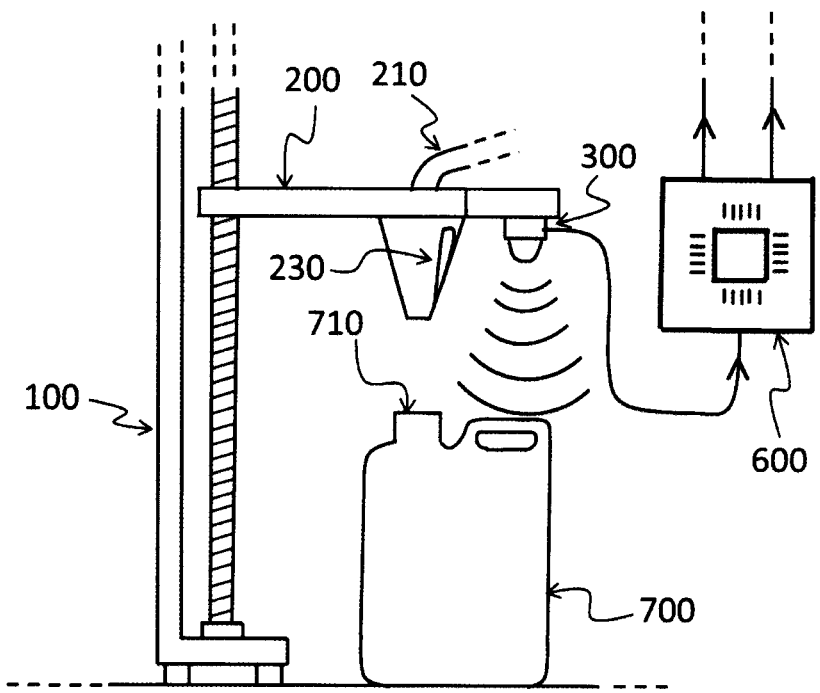
FIG. 6 is a partial view from the side of a liquid dispenser 1000 of the invention, showing the liquid outlet element 200 provided with a cone shaped lower end and a spatiality sensor 300 in the form of a proximity sensor that transmits electromagnetic radiation or sound waves downwards towards the receiving container 700 for estimation by the control unit 600 of the distance between the cone shaped lower end of the liquid outlet element 200 and the receiving aperture 710 of the receiving container 700, according to examples of the invention.
Figure 7:
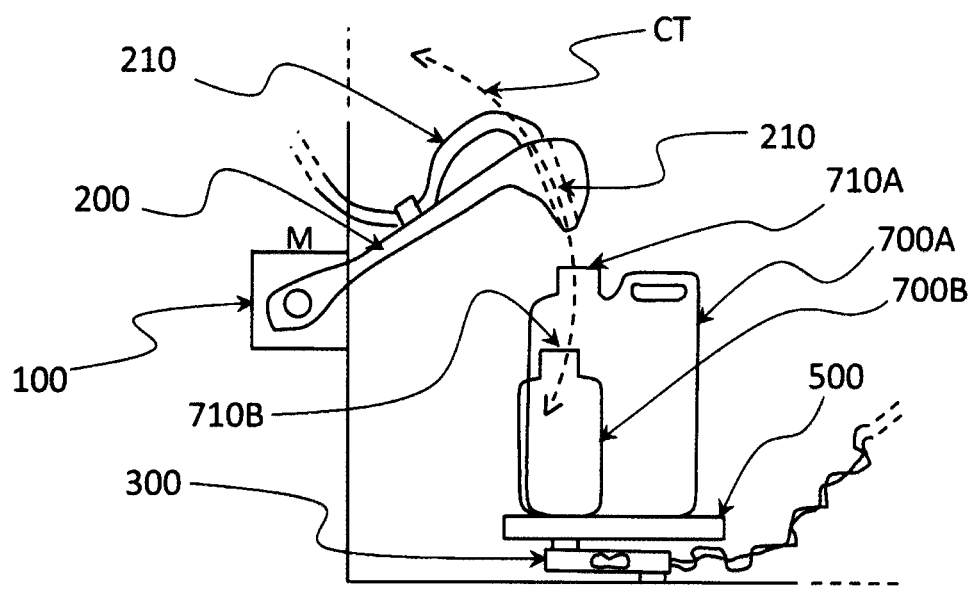
FIG. 7 is a partial view from the side of a liquid dispenser 1000 according to the invention, comprising a the liquid conductor 210 that continues within and exits from the inner volume of a cone shaped lower end of the liquid outlet element 200, being an elongated arm extending from a pivot point of the vertical actuator 100 being e.g. a step motor or a servo motor, a horizontal support 500 connected at its lower side to the upper side of a spatiality sensor 300 in the form of a load cell, in turn connected at its lower side to an extension, in form of a common frame, of the vertical actuator 100 so that the load cell is in a spatial constant relationship with the vertical actuator 100, and two superimposed receiving containers 710A and 710B of different heights with upper receiving apertures 710A and 710B, respectively, of which vertical projection encompasses the liquid outlet opening at the central lower point of the cone shaped part of the liquid outlet element 200, along its slightly curved trajectory CT, according to examples of the invention.

In a typical case of use, the user may place the receiving container 700 at an intended surface within or in front of the liquid dispenser 1000. The intended surface may preferably be visibly indicated, e.g. with markings, indicative impressions or the like, for different kinds of receiving containers 700. The receiving container 700 is essentially placed with an open receiving aperture 710, e.g. a circular opening from which any cap, such as e.g. a screw cap, has been removed, facing upwards towards the liquid 220 exit point of the liquid conductor 210, being located at the lower side of the liquid outlet element 200. Upon sensing of placement of the receiving container 700 by the spatiality sensor 300, alternatively by an alternative sensor such as e.g. a photo sensor or the like, an electric signal from the same is output to the control unit 600. This signal may contain information on increase in weight and/or significant change in variance of the weight over adjacent time-slots, such as in the case of the combination of a load cell or other pressure sensor with a horizontal support 500 (FIGS. 3-5), when the receiving container 700 is placed on the horizontal support 500. It may also contain information on change in near-by objects, such as in the case when the spatiality sensor 300 is a proximity sensor (FIG. 6), when the receiving container 700 is placed under the same. The control unit 600, which may comprise a data processor and data storage space, may on basis of a therein running program or software decide that the placement of a receiving container 700 has occurred. For example, the weight may be scanned, e.g. with a frequency of 5 to 100 Hz or more, such as 40 to 90 Hz, and a significant change in variance of the weight over adjacent time-slots may be indicative of placement of a receiving container 700. It may at this point collect further data of relevance from the spatiality sensor 300, such as e.g. the weight of the receiving container 700, typically for subsequent decisions regarding type and degree of liquid already present in the receiving container 700. The control unit 600 may then send output commands to the vertical actuator 100 to move the liquid outlet element 200 vertically downwards. Upon receiving a signal from the spatiality sensor 300 which is indicative of either a minimum spatial state, in which the liquid outlet element 200 is not touching the receiving container 700 but is so close that a safe transfer of liquid 220 thereto may occur, or of a contacting state, in which the liquid outlet element 200 is touching the receiving container 700, the control unit 600 may send a stop-signal to the vertical actuator 100. The transitioning to a contacting state may be determined, for example, by scanning the weight of the receiving container 700, e.g. with a frequency of to 100 Hz or more, such as 40 to 90 Hz, and by observing a thereof indicative significant change in variance of the weight over adjacent time-slots. The distance the vertical actuator 100 has moved to this state from the liquid outlet element's 200 maximum spatial state, typically an upper endpoint in which the liquid outlet element 200 is at a maximal distance from the receiving container 700, may be indicative of the type of receiving container 700 which has been placed by comparison with an internal database. The control unit 600 may then make a decision on which type of liquid 220 to fill the receiving container 700 with, should the liquid dispenser 1000 be provided with a plurality of storage containers 800 and flow controllers 400, as readily understood by the skilled person. The control unit 600 may also make a decision on how much of liquid 220 to fill the receiving container 700, as dependent on type of receiving container 700 and any potential determined pre-filling of the same. The control unit 600 may then, after optionally having commanded the vertical actuator 100 to move the liquid outlet element 200 from a contacting state to a minimum spatial state, command the flow controller 400 to fill the receiving container 700 with a determined correct volume, to prevent e.g. overflow, the determined correct type of liquid 220. The weight of the dispensed liquid 220 may optionally be continuously measured to fill up with the determined correct volume. One advantage of carrying out the filling in the contacting state, independent of geometry of the lower end of the liquid outlet element 200, is that the user is prevented from removing the receiving container 700 during the filling to cause undesired exposure of the surrounding to the liquid 220. One advantage of carrying out the filling in the minimum spatial state, and employing a spatiality sensor 300 that does not rely on a contacting state for its duty, is that the risk of cross-contamination between different receiving containers 700 is minimized.

Hence, a receiving container 700 may be conveniently filled with a liquid 220 by employment of the liquid dispenser 1000 of the invention. The user may follow these steps to achieve this, wherein steps (i) and (ii) may be carried out in any order: (i) provide a liquid dispenser 1000 charged with a liquid 220; (ii) provide an empty or partly filled receiving container 700 having an open receiving aperture 710; (iii) place the receiving container 700 with said receiving aperture 710 facing upwards at the operative location of the liquid dispenser 1000; and (iv) remove the receiving container 700, now having the liquid 220 in its internal volume, from the operative location of the liquid dispenser 1000.

According to one embodiment, the flow controller 400 of the liquid dispenser 1000 may be a pump or a valve. Such a pump may be an electric pump well known in the art, activated by a control signal from the control unit 600 to provide liquid 220 through the liquid outlet element 200. Such a valve may be an electrically controlled two-way valve, closed and opened by corresponding control signals from the control unit 600 to provide liquid 220 through the liquid outlet element 200. The flow through the valve may be aided by an optional pump or by gravity by arranging the storage container 800 at an appropriate vertical elevation, as well known in the art.

According to one embodiment, the vertical actuator 100 may be mechanically coupled to the liquid outlet element 200 by a threaded screw mechanism. The liquid outlet element 200 may have internal threads corresponding to and through which this screw mechanism runs. The threaded screw mechanism may be driven by an electrical motor, whereby a rotation of the motor axis results in a vertical movement of the liquid outlet element 200.

According to one embodiment, the vertical actuator 100 may be provided with a sensor that detects and sends a corresponding electrical signal to the control unit 600, when the liquid outlet element 200 reaches the maximum spatial state. Such sensors are well known in the art and include, for example, a mechanical switch which is pressed by the liquid outlet element 200 in the maximum spatial state.

The spatiality sensor 300 may be adapted to estimate the distance between one point in one horizontal plane, within which the liquid outlet element 200 is residing, and another horizontal plane, within which the receiving container 700 is residing. According to one embodiment, the spatiality sensor 300 may be a non-contacting distance measuring sensor well known in the art. For example, an inductive proximity sensor, e.g. for metallic or conductive receiving containers 700, a capacitive proximity sensor, an ultrasonic proximity sensor, an IR proximity sensor, a photoelectric proximity sensor, a LIDAR proximity sensor or a short distance RADAR sensor.

Figure 2:
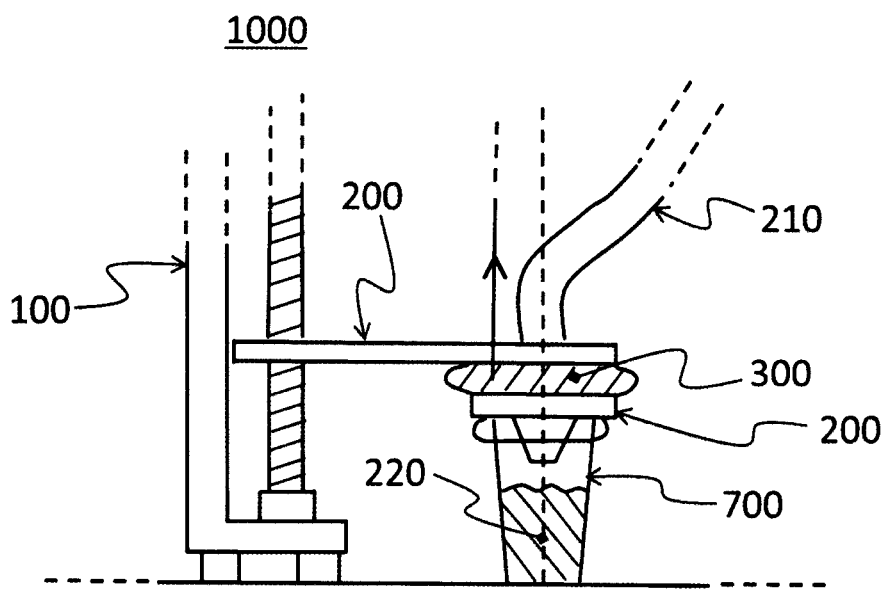
FIG. 2 is a partial view of the liquid dispenser 1000 of FIG. 1, in which the liquid outlet element 200 has been moved downwards vertically by the vertical actuator 100 to a contacting state, in which contacting state a force is applied to the lower side of the liquid outlet element 200 by its contact with the receiving container 700 and transferred to the spatiality sensor 300, which is slightly squeezed together, and in which view some liquid 220 has been transferred to the receiving container 700 via the liquid conductor 210, according to examples of the invention.

The spatiality sensor 300 may be adapted to detect a force change being due to the transition between a non-contacting state, in which said liquid outlet element 200 is not contacting said receiving container 700, and a contacting state, in which said liquid outlet element 200 is contacting said receiving container 700. According to one embodiment, the spatiality sensor 300 may be a force sensor well known in the art. For example, a pressure sensitive material with varying resistance, e.g. "Velostat™", or capacitance, as dependent on the applied pressure (compare FIGS. 1 and 2). Such a force sensor may be arranged such that increased pressure or force is applied on it when the liquid outlet element 200 enters a contacting state, e.g. as an integral part of the liquid outlet element 200 or in mechanical contact with and below the receiving container 700.

The spatiality sensor 300 may be substituted by the combination of a movement sensor of the liquid outlet element 200 or the vertical actuator 100, i.e. a vertical positioning sensor, and a procedure in which the liquid outlet element 200 is allowed to reach the contacting state prior to filling liquid 220 to the receiving container 700. For example, if the control unit 600 gives commands to the vertical actuator 100 to move the liquid outlet element 200 further downwards, but this is not reflected by accompanying signals from such a movement sensor, it may be concluded that a contacting state has been reached and that no movement is occurring due to the associated mechanical hindrance.

According to one embodiment, the spatiality sensor 300 may be a vertical positioning sensor, adapted to measure the vertical positioning of the liquid outlet element 200 relative the vertical actuator 100.

According to one embodiment, the liquid dispenser 100 may comprise a substantially horizontally arranged sheet shaped horizontal support 500 having a spatiality sensor 300 in the form of a force sensor, e.g. a load cell, arranged at its lower side. The horizontal support 500 being adapted to allow placement of the receiving container 700 on its upper side (compare FIGS. 3-5).

According to one embodiment, the liquid outlet element 200 may have a downwards pointing cone shaped form at its lower side and in which interior volume the liquid conductor 210 is partly comprised to protrude therefrom in the form of a liquid exiting nozzle or opening at the lower side of and centrally at the cone shaped form. According to one embodiment, the liquid outlet element 200 may have a downwards pointing cone shaped form at its lower side and in which interior volume the liquid conductor 210 is partly comprised to protrude therefrom in the form of a liquid exiting nozzle or opening at the lower side of and centrally at the cone shaped form, and the spatiality sensor 300 may be a non-contacting distance measuring sensor. Such a combination of features advantageously enables filling of receiving containers 700 with a minimized risk of cross-contamination while simultaneously preventing the user to remove a receiving container 700, provided that the lower end of the cone shaped form is within the inner volume of the receiving container 700 in the minimum spatial state.

According to one embodiment, the liquid outlet element 200 may comprise an incision extending along its outer lower surface. This feature advantageously allows the exiting of displaced air when filling liquid 220 in the contacting state.

According to one embodiment, the spatiality sensor 300 may be a load cell attached, on one side, to the lower side of the horizontal support 500 and, on the opposite side, to the vertical actuator 100, via a mechanical extension such as e.g. a frame. It may further provide electrical output indicative of the current downwards force applied to the horizontal support 500 to the control unit 600 with a frequency of at least 5 Hz, such as 40 to 90 Hz or 80 to 120 Hz. The force, i.e. weight, may be collected as a first set of trailing readings, such as e.g. 3 to 20, followed by a second set of trailing readings, such as e.g. 3 to 20. Unless a disturbance has occurred, such as e.g. the placement of a receiving container 700 on the horizontal support 500 or a transitioning from a non-contacting state to a contacting state due to e.g. the liquid outlet element 200 reaching the receiving container 700 in its downwards movement prior to filling, the variance of the first and second set of trailing readings are not expected to differ significantly. It is well known to the skilled person how such a test on difference in variance may be implemented in the control unit 600, e.g. on basis of the well known statistical F-test. Advantages of determination of either the placement of a receiving container 700, or the transitioning from a non-contacting state to a contacting state, include functional control of the liquid dispenser 1000 with only one sensor in the form of a load cell.

The present invention has been described above with reference to specific examples. However, other examples than the above described are equally possible within the scope of the invention. The different features and steps of the invention may be combined in other combinations than those described.

The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The invention claimed is:

1. A liquid dispenser for transfer of liquid from a storage container to a receiving container having a receiving aperture facing upwards, comprising a flow controller, a liquid conductor, a liquid outlet element, a vertical actuator, a spatiality sensor, a substantially horizontally arranged sheet shaped horizontal support and a control unit, wherein:

said flow controller is selected from the group of flow controllers consisting of valves and pumps and adapted to be in either an on-state, in which said liquid is transferred from said storage container via said liquid conductor and said liquid outlet element and said receiving aperture to said receiving container, or an off-state, in which said liquid is prevented from being transferred from said storage container to said receiving container, as dependent on electrical input from said control unit;

said vertical actuator is in mechanical communication with said liquid outlet element and adapted to set said liquid outlet element in a maximum spatial state, in which said liquid outlet element is arranged at a maximum distance from said receiving container without contacting the same, or in a minimum spatial state, in which said liquid outlet element is arranged at a minimum distance above said receiving container without contacting the same and simultaneously arranged with its liquid exit hole in the vertical projection of the receiving aperture, as dependent on electrical input from said control unit;

said spatiality sensor is adapted to detect a force change being due to the transition between a non-contacting state, in which said liquid outlet element is not contacting said receiving container, and a contacting state, in which said liquid outlet element is contacting said receiving container, and to provide information on such detection of force change in the form of electrical output to said control unit;

said horizontal support having said spatiality sensor arranged at its upper or lower side and being adapted to allow placement of said receiving container on its upper side; and said control unit is adapted to give electrical output to said vertical actuator and to said flow controller, as dependent on the processing of electrical input from said spatiality sensor.

2. The liquid dispenser according to claim 1, wherein said vertical actuator is further adapted to set said liquid outlet element in said contacting state.

3. The liquid dispenser according to claim 1, wherein said spatiality sensor is a force sensor.

4. The liquid dispenser according to claim 3, wherein said spatiality sensor is a load cell attached, on one side, to the lower side of said horizontal support and, on the opposite side, to said vertical actuator, optionally via an extension of said vertical actuator, to set said load cell and said vertical actuator in a static spatial relationship relative each other.

5. The liquid dispenser according to claim 4, wherein said load cell is adapted to provide electrical output indicative of the current downwards force applied to said horizontal support to said control unit with a frequency of at least 5 Hz.

6. The liquid dispenser according to claim 1, wherein said liquid outlet element is substantially flat at its lower side and in which interior volume said liquid conductor is partly comprised to protrude therefrom in the form of a liquid exiting nozzle or opening at the lower side of said liquid outlet element.

7. The liquid dispenser according to claim 1, wherein said liquid outlet element has a downwards pointing cone shaped form at its lower side and in which interior volume said liquid conductor is partly comprised to protrude therefrom in the form of a liquid exiting nozzle or opening at the lower side of and centrally at said cone shaped form.

8. The liquid dispenser according to claim 6, wherein said liquid outlet element comprises an incision extending along its outer lower surface, to allow the exiting of displaced air upon filling said liquid in said contacting state.

9. A method for production of a receiving container having liquid in its internal volume, comprising the steps (i) to (v) and wherein steps (i) and (ii) may be carried out in any order:

(i) providing a liquid dispenser according to claim 1 enabled to provide said liquid;

(ii) providing said receiving container having a receiving aperture;

(iii) placing said receiving container with said receiving aperture facing upwards at the operative location of said liquid dispenser;

(iv) filling said receiving container with said liquid by employment of said liquid dispenser; and (v) removing said receiving container having filling liquid in its internal volume from the operative location of said liquid dispenser.

* * * * *